United States Patent [19]

Brömer et al.

[11] 4,144,780

[45] Mar. 20, 1979

[54] MEANS FOR CONTROLLING THE FEED RATE OF A WORK PIECE IN A NUMERICALLY CONTROLLED NIBBLING MACHINE

[75] Inventors: Günter Brömer, Spardorf; Wolfgang Kanzler, Böblingen, both of Fed. Rep. of Germany

[73] Assignee: Siemens Aktiengesellschaft, Munich, Fed. Rep. of Germany

[21] Appl. No.: 744,883

[22] Filed: Nov. 24, 1976

[30] Foreign Application Priority Data

Dec. 12, 1975 [DE] Fed. Rep. of Germany ....... 2556108

[51] Int. Cl.² .................. B26D 3/00; B23D 27/00
[52] U.S. Cl. ............................ 83/71; 83/49; 83/72; 83/209; 83/237; 83/225; 83/916
[58] Field of Search ............... 83/50, 49, 62, 71, 72, 83/916, 209, 225, 230, 237

[56] References Cited

U.S. PATENT DOCUMENTS

| 3,563,123 | 2/1971 | Leibinger | 83/916 |
| 3,664,217 | 5/1972 | Schiewek et al. | 83/916 X |
| 3,958,479 | 5/1976 | Leibinger | 83/916 X |

*Primary Examiner*—Donald R. Schran
*Attorney, Agent, or Firm*—Kenyon & Kenyon, Reilly, Carr & Chapin

[57] ABSTRACT

A numerically controlled nibbling machine including means for controlling the feed rate of the work piece with respect to the work tool of the machine and in which the feed distance or travel of the work piece is limited by a release time in which the work tool is disengaged from the work piece according to a predetermined number of strokes of the work tool per unit of time. The improvement of the invention comprises the provision of means for determining the release time of the work tool in a single stroke of the work tool for any number of strokes of the tool, and means for automatically determining the minimum accelerations and decelerations of the work piece required for travelling the feed distance and for forming a desired feed rate value for the work piece from the determined release time of the work tool and the feeding distance of the work piece per stroke.

6 Claims, 2 Drawing Figures

MEANS FOR CONTROLLING THE FEED RATE OF A WORK PIECE IN A NUMERICALLY CONTROLLED NIBBLING MACHINE

BACKGROUND OF THE INVENTION

1. Field of the Invention

This invention relates generally to numerically controlled nibbling machines, and in particular to an improved means for controlling the feed rate of the work piece with respect to the work tool of such a machine.

2. Description of the Prior Art

Numerically controlled nibbling machines including an apparatus for setting or controlling the feed rate of the work piece with respect to the work tool of the machine in which the available feed distance or travel of the work piece is limited by a release time in which the work tool is disengaged from the work piece according to a predetermined number of strokes of the work tool per unit of time are generally known in the art. See, for example, Siemens-Zeitschrift 1970 and 1973, specifically pages 74–79 and 70–71, respectively, of the respective Supplements on Numerical Control. Such nibbling machines are extensively used at present in sheet metal fabrication. During continuous nibbling, the work piece feed mechanism is released at every stroke by means of end switches disposed in the path of the ram of the nibbling machine, i.e., during the time during which the work tool is outside or disengaged from the work piece. Such nibbling machines operate at speeds of up to 400 strokes per minute and at relatively small clearances of the work tool of a few millimeters. As a result, feeding of the work piece is possible only during a very short period of time.

In present day controls for such machines, the feed rate is predetermined by a programmer, and the feed distance travelled per stroke of the work tool is then obtained in conjunction with the respective available release time. Such programming requires a calculating effort on the part of the programmer. In addition, large mechanical stresses can occur in the machine as a result of the release and interruption of the feeding of the work piece which must be adapted to the highest number of strokes and the largest sheet metal thickness.

SUMMARY OF THE INVENTION

It is therefore an object of the present invention to overcome the aforementioned disadvantages of heretofore known numerically controlled nibbling machines and to provide an improved means for controlling the feed rate of the work piece with respect to the work tool of the machine which permits the release time to be utilized to the largest extent possible and which optimizes protection of the nibbling machine.

These and other objects of the invention are achieved in a numerically controlled nibbling machine including means for controlling the feed rate of the work piece with respect to the work tool of the machine and in which the feed distance or travel of the work piece is limited by a release time during which the work tool is disengaged from the work piece according to a predetermined number of strokes of the work tool per unit of time. The improvement of the invention comprises the provision of means for determining the release time of the work tool in a single stroke of the work tool for any number of strokes of the tool, and means for automatically determining minimum accelerations and decelerations of the work piece required for travelling the feed distance and for forming a desired feed rate value for the work piece from the determined release time of the work tool and the feeding distance of the work piece per stroke. This arrangement permits the distance-time area of the velocity curve of the work piece to be divided in an advantageous manner with respect to the velocity and minimizes the strain on the nibbling machine.

The means for automatically determining the minimum accelerations and decelerations of the work piece may comprise means for determining minimum accelerations and decelerations when a period of acceleration is immediately followed by a period of deceleration of the work piece. This determination process is simplified if it is assumed that the acceleration period and deceleration period and the minimum accelerations and decelerations are equal. When this is done, the setting of brakes can be obtained directly from the release time. Further simplification can be achieved by choosing the accelerations and decelerations as constants.

The nibbling machine may also comprise means for determining the difference between a predetermined, set value and an actual value for the feed rate, i.e., the feed velocity, of the work piece at at least one time during the acceleration period and the deceleration period of the work piece and for generating a stop command signal for the nibbling machine when a predetermined difference value is exceeded. Such an arrangement permits the desired speed of the machine to be determined in a simple manner and permits determination of whether the nibbling machine is lagging too far behind the predetermined set value during acceleration of the work piece or whether the feed velocity of the work piece is too high during deceleration of the work piece even though the set value of the feed velocity is decreasing.

The machine may also comprise means for generating a stop command signal for the nibbling machine when a maximum value for the feed rate or the calculated acceleration is exceeded. Such an arrangement permits programming errors to be discovered which would otherwise cause damage to the machine.

These and other novel features and advantages of the invention will be described in greater detail in the following detailed description.

BRIEF DESCRIPTION OF THE DRAWINGS

In the drawings, wherein similar reference numerals denote similar elements throughout the several views thereof.

DETAILED DESCRIPTION

Figure 1:
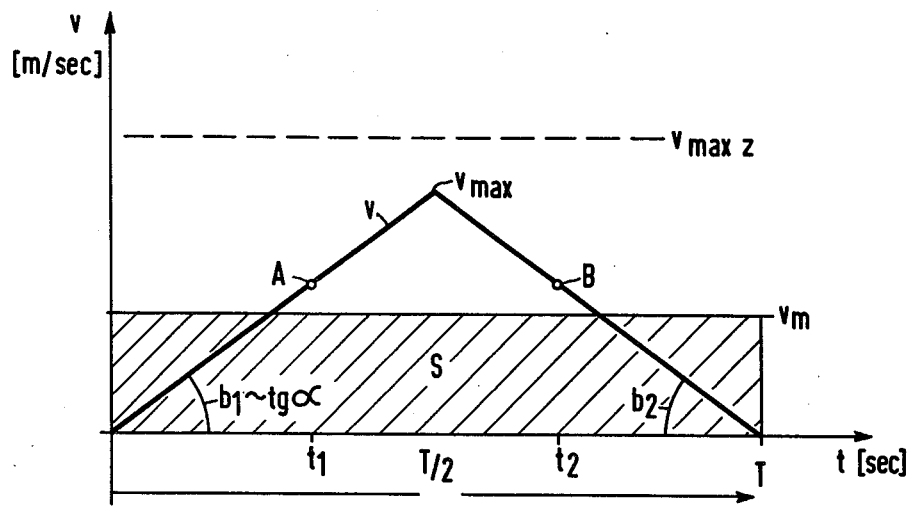
FIG. 1 is a graphical illustration of the work piece feed rate versus time of an improved numerically controlled nibbling machine constructed according to the present invention.

Referring now to the drawings, and in particular to FIG. 1, there is shown a graphical illustration of the work piece feed rate or velocity versus time during the release time T in which feeding of the work piece can be carried out. This release time is first determined by measurement, for example, during an idle stroke of the work tool. The feed distance or travel to be travelled during each stroke of the work tool, which is predetermined and pre-programmed in the machine, is identified by the reference character s and is represented by the rectangular cross-hatched area in the velocity-time diagram of FIG. 1. A constant feeding velocity $v_m$ is assumed. In accordance with the invention, the feed velocity v during feeding of the work piece is chosen so that the same area s is obtained but in the shape of a triangle. The maximum feed velocity $v_{max}$ is reached during the time interval extending from the starting point, i.e., time zero (which is provided by an end switch of the machine), to the time T/2 and is obtained from the product of the work piece acceleration $b_1$ and time T/2. This acceleration is, as shown in the diagram of FIG. 1, approximately equal to the tangent of the angle $\mu$ of the velocity curve between the time axis t and the acceleration portion of the velocity curve. After time T/2, negative acceleration, i.e., deceleration $b_2$ occurs and the desired velocity value v decreases to zero at time T. It should be noted that a small tolerance distance is maintained at time T so that the work piece feed is stopped before the work tool of the machine penetrates into the work piece. The lag errors, i.e., the difference between the desired and actual value of the feed velocity, are monitored at points A and B on the velocity curve at times $t_1$ and $t_2$. The largest permissible feed rate of the work piece is represented by the dashed lines identified by reference character $v_{maxZ}$.

The accelerations $b_1$ and decelerations $b_2$ are determined as follows:

First, one-half of the area S/2 is obtained (assuming a mean velocity $v_m$) by the following equation:

$$S/2 = v_m(T/2)$$

In accordance with the preceding definitions, this area must be equal to one-half the area of the triangle defined by the velocity curve v. This is defined by the following equation:

$$\tfrac{1}{2} \cdot (T/2) \cdot v_{max} = v_m \cdot (T/2)$$

Thus,
$$v_{max} = b_1 \cdot (T/2)$$

The value for accelerations $b_1$ is obtained from the equation as follows:

$$b_1 = S/T^2$$

The value for decelerations $b_2$ is the same and is obtained in an analogus manner.

The desired velocity value v for the work piece feed rate can then be obtained by multiplying the values obtained for accelerations $b_1$ and decelerations $b_2$ by the time t. The feed velocity v will initially increase linearly, as shown in the diagram of FIG. 1, and then will linearly drop to zero again. The peak of the velocity v at the reversal point is smoothed by the work piece feed rate control and the nibbling machine.

Figure 2:
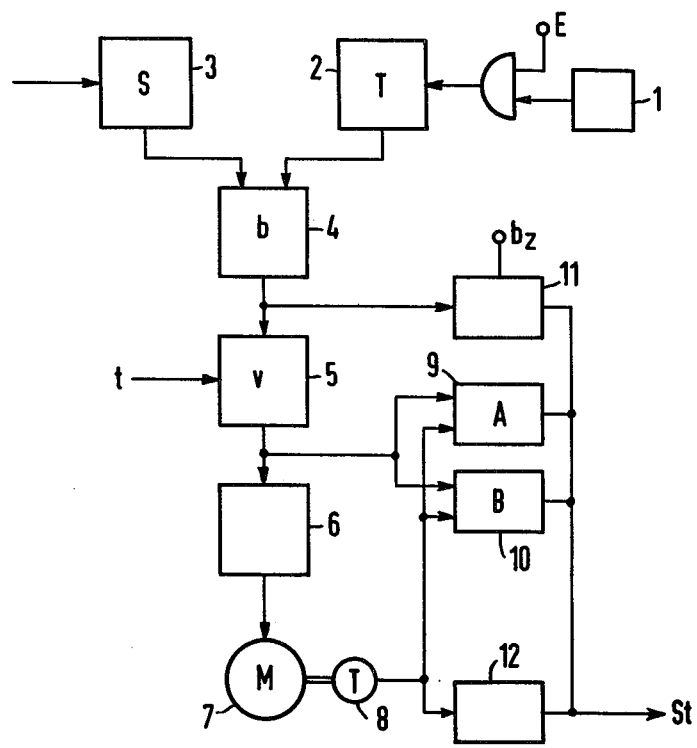
FIG. 2 is a schematic circuit diagram of the feed rate control means for an improved numerically controlled nibbling machine constructed according to the present invention.

A schematic circuit diagram of an improved controlling means constructed according to the invention is illustrated in FIG. 2. It should be noted at this point that in a numerically controlled machine tool, particularly a machine tool utilized in conjunction with computers, the individual components of the circuit may be formed by modules or memories of the computer.

End switches disposed in the path of the ram of the nibbling machine generate electrical signals E which are transmitted to an AND gate coupled to a clock 1. The signals E are generated during the release time T measured during an idle stroke of the work tool of the machine and couple clock 1 through the gate to a storage device 2 which, after the idle stroke of the work tool, contains a value corresponding to release time T. The value of release time T is stored in a memory 3 and is combined with the programmed feed travel per stroke S in an acceleration computer 4 which computes the acceleration in accordance with the equations set forth above. The desired velocity value v is formed from the computed acceleration by multiplication by time in a velocity computer 5. Computer 5 is coupled to a controller 6 and a motor 7 coupled to the feed mechanism for the work piece of the nibbling machine. The actual value of the velocity is determined by a tachometer generator 8 coupled to motor 7 and is compared at times $t_1$ and $t_2$ with the instantaneous feed velocities v in modules 9 and 10, which may comprise comparators, both of which are coupled to the output of tachometer 8 and the output of velocity computer 5. If this comparison shows that the actual value lags behind the desired value at time $t_1$ and the actual value excessively leads the desired value at time $t_2$, a stop command signal St for the nibbling machine is generated by the modules. Another module 11, which may comprise a comparator, is coupled to the output of acceleration computer 4 and the output of modules 9 and 10 and compares the calculated acceleration b with a maximum permissible value $b_z$. If this comparison indicates that the calculated acceleration exceeds the permissible value, a stop command signal St is generated. Another module 12, which also may be a comparator, is coupled to the output of tachometer 8 for monitoring the desired velocity value. If this desired velocity value exceeds a maximum permissible value $v_{maxZ}$, the stop command signal St is generated.

It should be noted that the transformation of the rectangular travel area s need not be performed in such a manner that a triangular area is formed. Any other modification is also possible as long as the accelerations and decelerations of the work piece do not exceed their limits.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In a numerically controlled nibbling machine including means for controlling the feed rate of the work piece with respect to the work tool of the machine and in which the feed distance of the work piece is limited by a release time during which the work tool is disengaged from said work piece according to a predetermined number of strokes of the work tool per unit of time, the improvement comprising, means for determining said release time of said work tool in a single stroke of said work tool for any number of strokes of said tool, and means for automatically determining minimum accelerations and decelerations of said work piece required for travelling said feed distance and for forming a desired feed rate value for said work piece from the determined release time of said work tool and the feed distance of said work piece per stroke.

2. The nibbling machine recited in claim 1, wherein said means for automatically determining comprises means for automatically determining said minimum accelerations and decelerations of said work piece when a deceleration period of said work piece immediately follows an acceleration period of said work piece.

3. The nibbling machine recited in claim 1, wherein said minimum accelerations and decelerations of said work piece and said acceleration and deceleration periods of said work piece are equal.

4. The nibbling machine recited in claim 1, wherein said minimum accelerations and decelerations are constant.

5. The nibbling machine recited in claim 1, further comprising means for determining the difference between a desired value and an actual value for said feed rate of said work piece at at least one point in time during each of said acceleration and deceleration periods of said work piece and for generating a stop command signal for said machine when a predetermined value for said difference is exceeded.

6. The nibbling machine recited in claim 1, further comprising means for generating a stop command signal when a maximum value for said feed rate or the calculated acceleration of said work piece is exceeded.

* * * * *